UNITED STATES PATENT OFFICE.

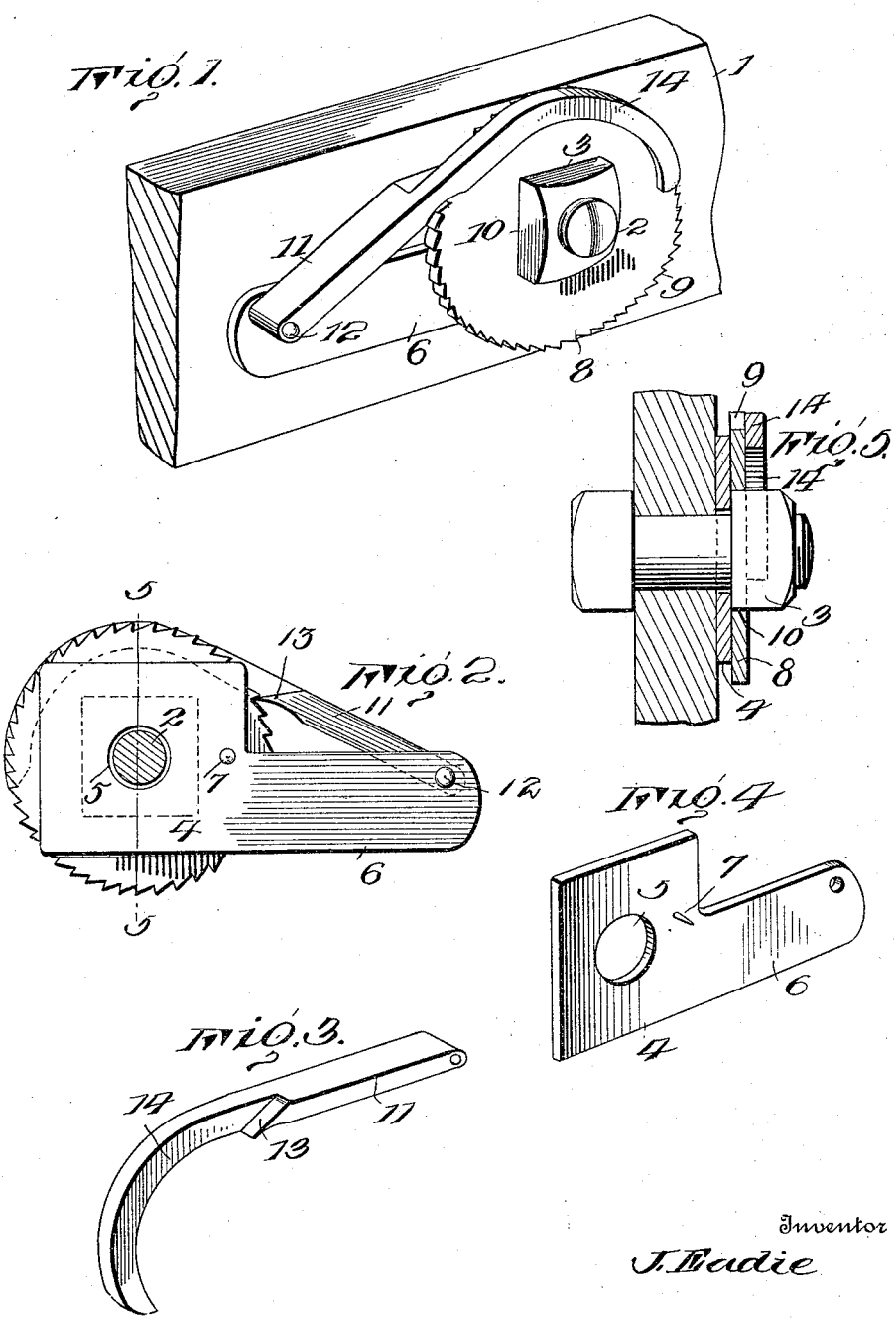

JAMES EADIE, OF BOONE, IOWA.

NUT-LOCK.

1,188,420.  Specification of Letters Patent.  Patented June 27, 1916.

Application filed January 25, 1916. Serial No. 74,232.

*To all whom it may concern:*

Be it known that I, JAMES EADIE, a citizen of the United States, residing at Boone, in the county of Boone and State of Iowa, have invented certain new and useful Improvements in Nut-Locks, of which the following is a specification.

This invention relates to nut locking devices and has as its object to provide a device of this character which may be employed in connection with any ordinary bolt and nut without requiring alteration in the form or structure of either of these parts as ordinarily placed upon the market.

Another aim of the invention is to provide a nut locking device which may be employed in connection with the ordinary nut and bolt and which will not by reason of its application thereto in any way break down or mutilate the threads upon the nut or the bolt or render these members unfit for use a second time.

Another aim of the invention is to so construct the device that the same may be employed repeatedly or, in other words, removed from one nut and bolt and readily and conveniently applied to another nut and bolt.

Another aim of the invention is to provide a nut locking device which will not interfere with repeated tightening of the nut whenever found necessary and which will act automatically to lock the nut in its new position of adjustment.

The device embodying the present invention includes in its structure a locking disk of ratchet formation and a pawl designed to coöperate with the said disk to hold the disk against backward rotation, and the invention aims to so construct this pawl that the same will constitute also a means for preventing accidental disengagement of the disk from the nut.

In the accompanying drawings: Figure 1 is a perspective view of the nut locking device embodying the present invention. Fig. 2 is a rear elevation of the device, the bolt being shown in section. Fig. 3 is a perspective view of the pawl removed. Fig. 4 is a perspective view of the washer plate removed. Fig. 5 is a vertical longitudinal section view on the line 5—5 of Fig. 2.

In the drawings, the numeral 1 indicates a member which is to be secured by a nut and bolt and this member may be, so far as the locking device of the present invention is concerned, either of wood or of metal. The bolt is indicated by the numeral 2 and the nut by the numeral 3 and these parts are of the ordinary construction as now placed upon the market, the nut being threaded upon the bolt in the usual manner.

The nut locking device embodying the present invention includes a washer plate indicated by the numeral 4 provided with an opening 5 through which is passed the bolt 2, the plate being provided at one lateral edge with an extension 6 occupying the same plane as the body portion of the said plate. The plate is also provided upon that face which is to be disposed against the member 1, with a spur or shoulder 7 designed to either bite into the said member or enter a socket or opening previously formed therein for its reception. This spur or shoulder, of course, serves to prevent rotation of the washer plate with respect to the member and to the bolt 2, although where the locking device is to be employed in connection with a rail joint or like structure in which a shoulder would be afforded adjacent the plane surface against which the washer plate is disposed, the spur may be omitted and one edge of the washer plate may rest against the said shoulder, thereby preventing rotation of the said plate.

The device also includes a locking disk which is indicated by the numeral 8 and the periphery of which is formed with ratchet teeth 9. This disk is provided centrally with an opening 10 of polygonal form and designed to snugly receive the nut 3, the disk, however, being of a thickness considerably less than the thickness of the nut so that when the disk is assembled with the nut and is in position against the outer face of the washer plate 4, the nut will project beyond the outer face of the disk a sufficient distance to permit of the application thereto of a suitable wrench whereby the nut may be tightened without the necessity of removing the locking disk therefrom.

In connection with the locking disk above described there is employed a locking pawl indicated by the numeral 11 and this pawl is pivotally mounted at one end as at 12 upon the lateral extension 6 of the washer plate 4. The pawl is provided with a locking tooth 13 designed to coöperate with the ratchet periphery 9 of the locking disk 8 as the disk is rotated in the direction corresponding to the direction of rotation of the nut as the same is tightened. The pawl 11 is provided with a curved finger 14 which constitutes an extension of the said pawl, the finger extending beyond the tooth 13 and being curved on such an arc that when the pawl is in operative engagement with the locking disk 8 the finger will lie close beside the outer face of the locking disk at the upper side thereof. Therefore, when the pawl is in operative engagement with the locking disk the finger will constitute a means for preventing accidental outward displacement of the locking disk with relation to the nut 3 and the locking disk will in its rotative movement due to tightening of the nut, be guided and held in proper position for the coöperation of the tooth 13 with its ratchet periphery. The pawl rests, of course, by gravity in operative engagement with the locking disk and it will be understood that as the finger 14 is arcuate in form and consequently has its concave side spaced from the sides of the nut 3, a wrench may be applied to the nut at any time found desirable and the nut may be rotated in a direction to tighten the same, the tooth 13 of the pawl successively engaging the teeth 9 of the said disk so that when the wrench is removed the nut will have been automatically locked in its new position of adjustment. It will, of course, be understood that whenever it is desired to remove the nut 3 or to loosen the same, the locking pawl 11 may be swung upwardly out of engagement with the locking disk and the nut may then be rotated backwardly either with or without having first removed the said locking disk.

Having thus described the invention, what is claimed as new is:

1. A nut locking device including a locking member designed for application to a nut to be locked and having a ratchet portion, and a locking pawl having a tooth for coöperation with the said ratchet portion and having a portion designed to extend beside the outer face of the said locking member to retain the locking member in place.

2. In a nut locking device of the class described, a locking member designed for application to a nut to be locked, and having a ratchet portion, and a pivoted pawl having a tooth for coöperation with the said ratchet portion and provided with a finger extending beyond the said tooth and beside one face of the said member and constituting a means for preventing disengagement of the member from a nut to which it is applied.

3. A nut locking device of the class described, including a locking member having a ratchet portion, the said member being designed for application to a nut to be locked, and a pivoted pawl having a tooth for coöperation with the said ratchet portion and provided with an arcuate finger extending beyond the said tooth and designed to extend beside the outer face of the said locking member whereby to restrain the same from disengagement from a nut to which it is applied.

4. A nut locking device of the class described, including a washer plate designed to be held relatively stationary, a locking disk adapted for disposal upon a nut to be locked and against one face of the said plate, and a pawl pivoted to the plate and having a tooth designed for coöperation with the periphery of the locking disk and having a finger extending beyond the said tooth and designed to extend beside the outer face of the said disk whereby to restrain the same against disengagement from the nut to which it is applied.

5. In a nut locking device of the class described, the combination with a bolt and a nut designed to be locked against backward rotation thereon, of a washer plate fitted to the bolt and secured by the nut, a pawl pivoted to the washer plate, a ratchet disk fitted to the nut and designed for the coöperation therewith of the tooth of the pawl, and a finger extending from the pawl and beside the outer face of the said locking disk and restraining the same against displacement from the nut.

6. In a nut locking device of the class described, the combination with a bolt and a nut designed to be locked against backward rotation thereon, of a washer plate fitted to the bolt and secured by the nut, means carried by the said washer plate for holding the same against rotation with respect to the bolt, a pawl pivoted to the washer plate, a ratchet disk fitted to the nut and designed for the coöperation therewith of the tooth of the pawl, and a finger extending from the pawl and beside the outer face of the said locking disk and restraining the same against displacement from the nut.

In testimony whereof I affix my signature.

JAMES EADIE. [L. S.]

Copies of this patent may be obtained for five cents each, by addressing the "Commissioner of Patents, Washington, D. C."